March 14, 1967  D. D. HAMILTON  3,308,861
DELIMBER
Filed Dec. 18, 1964  11 Sheets-Sheet 1

INVENTOR
DOUGLAS D. HAMILTON

March 14, 1967   D. D. HAMILTON   3,308,861
DELIMBER
Filed Dec. 18, 1964   11 Sheets-Sheet 2

INVENTOR
DOUGLAS D. HAMILTON

INVENTOR
DOUGLAS D. HAMILTON

March 14, 1967 D. D. HAMILTON 3,308,861
DELIMBER

Filed Dec. 18, 1964 11 Sheets-Sheet 4

INVENTOR
DOUGLAS D. HAMILTON
BY
Martin J Marcus
PATENT AGENT

March 14, 1967  D. D. HAMILTON  3,308,861
DELIMBER
Filed Dec. 18, 1964  11 Sheets-Sheet 5
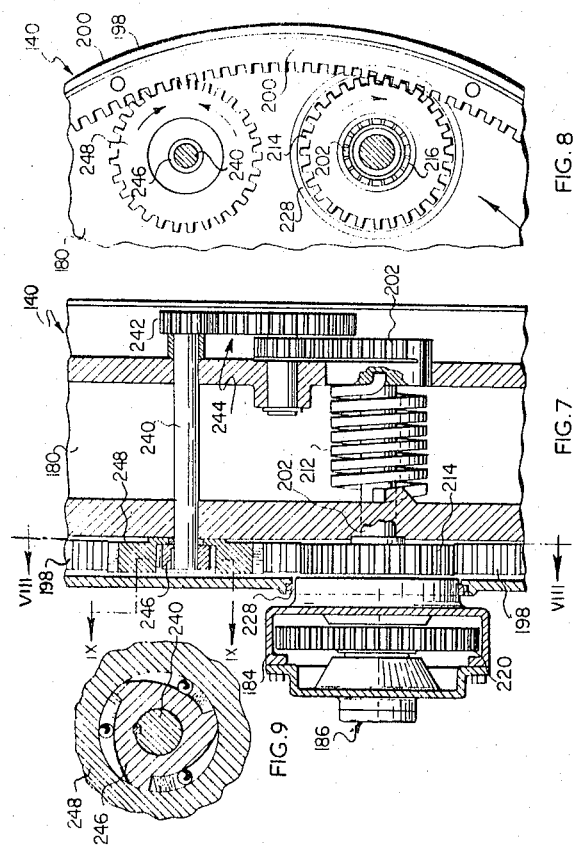
INVENTOR
DOUGLAS D. HAMILTON March 14, 1967 D. D. HAMILTON 3,308,861
DELIMBER Filed Dec. 18, 1964 11 Sheets-Sheet 6

INVENTOR
DOUGLAS D. HAMILTON
BY
*Martin J Marcus*
PATENT AGENT

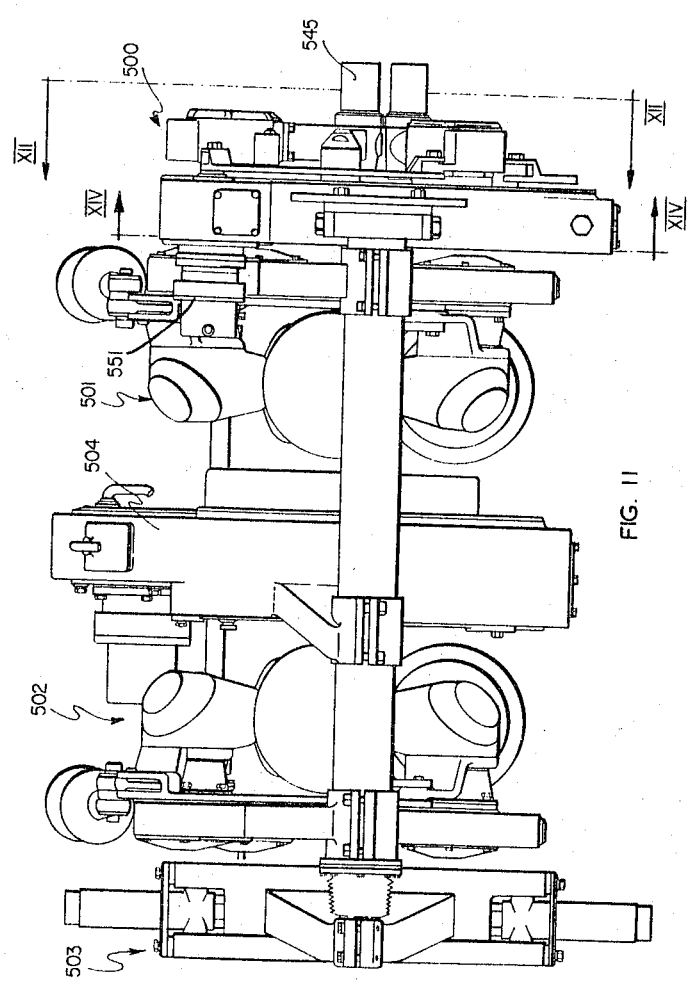

March 14, 1967 D. D. HAMILTON 3,308,861
DELIMBER
Filed Dec. 18, 1964 11 Sheets-Sheet 8

INVENTOR
DOUGLAS D. HAMILTON
BY
Martin J Marcus
PATENT AGENT

March 14, 1967  D. D. HAMILTON  3,308,861
DELIMBER
Filed Dec. 18, 1964  11 Sheets-Sheet 10

INVENTOR
DOUGLAS. D. HAMILTON
BY
Martin J Marcus
PATENT AGENT

March 14, 1967  D. D. HAMILTON  3,308,861
DELIMBER

Filed Dec. 18, 1964  11 Sheets-Sheet 11

INVENTOR
DOUGLAS D. HAMILTON
BY
Martin J Marcus
PATENT AGENT

United States Patent Office 3,308,861
Patented Mar. 14, 1967

3,308,861
DELIMBER
Douglas D. Hamilton, Mount Royal, Quebec, Canada, assignor of one-third to Canadian International Paper Company, one-third to Quebec North Shore Paper Company, both of Montreal, Quebec, Canada, and one-third to Albitibi St. Anne Paper Ltd., Beaupre, Quebec, Canada, all corporations of Canada
Filed Dec. 18, 1964, Ser. No. 419,422
40 Claims. (Cl. 144—3)

This application is a continuation in part of application Serial No. 40,294, filed July 1, 1960, which is now abandoned.

This invention relates to the art of processing raw timber and, more particularly, to the removal of limbs.

In a timber operation of the type to which this invention particularly relates, trees are felled in the forest, the limbs removed and the trunk of or bole is cut into predetermined lengths, called bolts, which are then transported to the mill. To a large extent, the removal of the limbs has been performed by hand after falling. (Since, particularly in processing pulp wood, the bark cannot be used, the bark has to be removed. This has been done as a separate operation, usually at the mill, by removing the bark from each of the cut sections or bolts. Thus, in processing wood for pulp, after the tree has been felled, the tree has been passed through three separate and distinct processing steps, the first, to remove the limbs, the second, to remove the bark, and the third, to cut the debarked and delimbed tree into sections.) Processing trees in this manner has been time-consuming and costly.

A principal object of one feature of the present invention is the provision of a machine which will remove the limbs from felled trees.

According to a broad aspect of the present invention, there is provided an apparatus comprising: an annular housing fixed to a support means and encircling a linear feed path; said annular housing carrying a plurality of rotatable supports, the supports being spaced circumferentially around said housing; a plurality of arms, each of said arms being fixed to one of said supports, the opposite end of each of said arms being movable towards and away from said feed path by rotation of said supports; delimbing means carried on said arms; and means for rotating each of said plurality of supports in one direction for moving said arms toward said feed path and in another direction for moving said arms away from said feed path.

According to a specific aspect of the present invention, there is provided an apparatus comprising: an annular housing fixed to a support means and encircling a linear feed path; said annular housing carrying a plurality of rotatable shafts, the shafts being spaced circumferentially around said housing; a plurality of arms, each of said arms being fixed to one of each said shafts, the opposite end of each of said arms being movable towards and away from said feed path by rotation of said shafts; delimbing means carried on said arms and means for rotating each of said plurality of shafts in one direction for moving said arms toward said feed path and in another direction for moving said arms away from said feed path.

By another aspect of one embodiment of the present invention there is provided a delimber comprising: a support means; means supported by said support means for feeding a felled tree along a substantially linear feed path; an annular housing mounted on said support means and encircling said linear feed path; a plurality of secondary housings mounted on said annular housing, said secondary housings being circumferentially spaced around said annular housing and projecting therefrom; a plurality of shafts, each shaft being rotatably mounted at one end within one of said secondary housings and having a free end projecting therefrom; means for rotating said shafts; a cutter head fixed to the free end of each of said shafts for rotation therewith; means for moving said secondary housings in a first direction; means responsive to said movement in said first direction for moving said cutter heads toward said linear path into engagement with a felled tree in said path; means for moving said secondary housings in a second direction; and means responsive to said second movement for moving said cutter heads away from said linear path and out of engagement with a felled tree in said path.

By an aspect of another embodiment of the present invention there is provided a delimber comprising: means for supporting and feeding a tree axially along a substantially linear feed path; an annular housing fixed to said support means and encircling said linear feed path, said annular housing carrying a plurality of rotatable collars, the collars being spaced circumferentially around said housing and having one end projecting therefrom; a plurality of arms, each of said arms being fixed at one of its ends to one of said collars, the opposite end of the arm being movable towards and away from the feed path by rotation of its respective collar, each of said arms having a second shaft rotatably mounted at said opposite end; delimbing means carried by each of said second shafts; and means for rotating each of said collars in one direction for moving said arms towards said feed path and in another direction for moving said arms away from said feed path.

In the accompanying drawings:

FIG. 7 is a fragmentary end view along the line VII—VII of FIG. 6;

FIG. 8 is a sectional view along the line VIII—VIII of FIG. 7;

FIG. 9 is a fragmentary view, in section, along the line IX—IX of FIG. 6;

FIG. 11 is a side elevational view of another embodiment of a delimber of the present invention, together with feed rollers and debarker shears;

Figure 1:
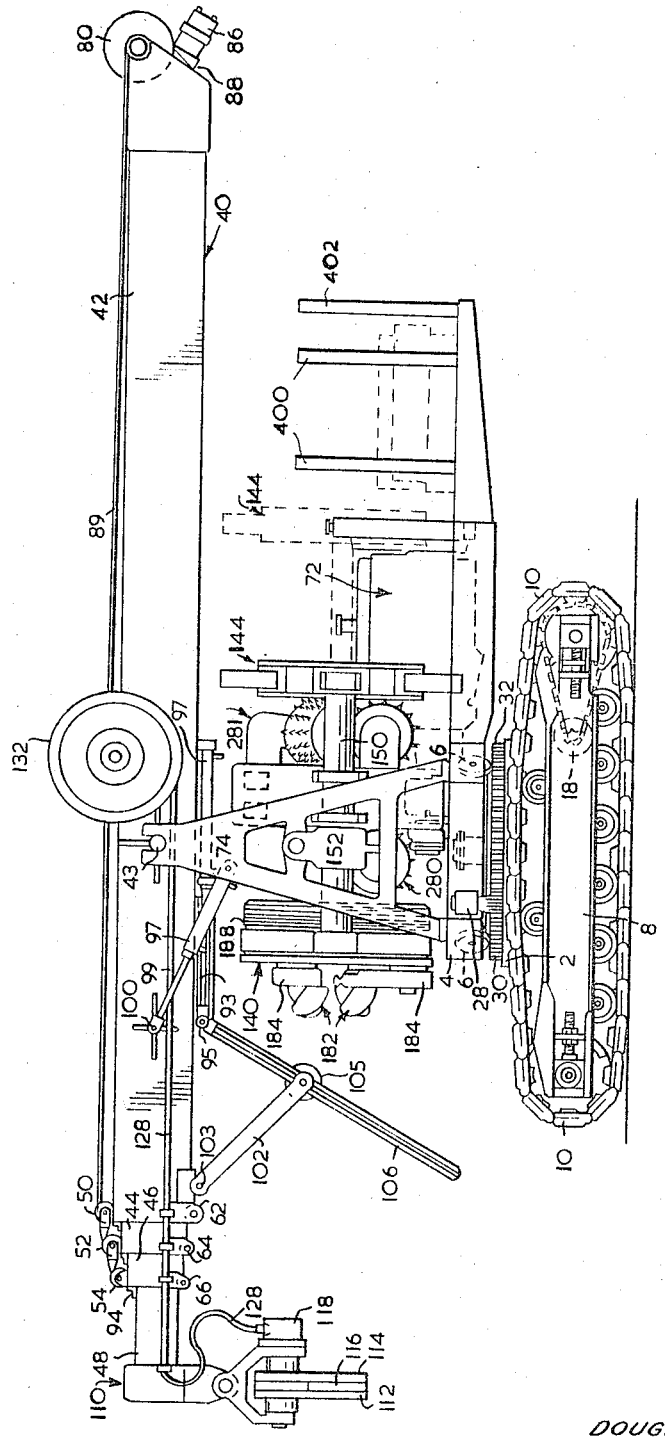
FIG. 1 is a side elevation view of a machine incorporating an embodiment of the delimber of the present invention.

As illustrated in the drawings, the present invention provides a part of a unitary machine for processing felled trees in the forest, more particularly, disclosed and claimed in my pending application Serial No. 40,294. The machine includes a grapple for engaging and feeding felled trees into the machine, the delimber of the present invention for removing limbs from the tree trunk, a debarker for removing the bark from the delimbed trunk and shears or knives for cutting the delimbed and debarked trunk into preselected lengths. The processing machine is mounted on a self-propelled tractor provided with treads and may be readily moved from place to place in the forest. After a tree has been felled and is laying on the ground, the processing machine of the invention is moved into position, the trunk of the tree is engaged by the grapple and the tree trunk fed into the machine. As the tree passes through the machine, the limbs and bark are removed from the trunk and the delimbed and debarked trunk is then cut into preselected lengths and deposited in a cradle carried on the machine. The processed cut sections are then removed from the cradle and transported to a mill.

The self-propelled tractor and the processing units of the machine including the delimber of the present invention are powered from a single power plant which may be a diesel or gasoline engine or other suitable power source, each unit being controlled from controls conveniently located at a central control point on the machine. Thus, the entire machine may be operated by one man, the operator first moving the machine into position in the forest and then, from the central control point, selecting a felled tree, engaging the selected tree with the grapple, elevating and feeding the tree into the machine where the limbs are removed by the delimber of the present invention and where the bark is removed from the tree and where the remaining tree trunk is cut into preselected lengths. Thus, through the aforementioned machine, a single operator can take felled trees, as they lie on the ground in the forest, and completely process the tree, removing the limbs and bark, and cutting the tree trunk into sections. As discharged from the machine, the sections are transported to the mill.

The delimber of the present invention, as well as the debarking and feed mechanisms, the shears and the cradle of the machine are mounted on the tractor in substantially horizontal, tandem alignment and the grapple, provided with adjustable jaws, is carried at the end of an extensible boom mounted above the processing units. The processing units and the boom are mounted for rotation together about a vertical axis on the tractor base, the boom being pivoted to allow lowering and raising of the grapple. Hence, with the tractor positioned, the machine can be operated to process felled trees lying on the ground around the tractor and outwardly to the reach of the fully extended boom.

Figure 2:
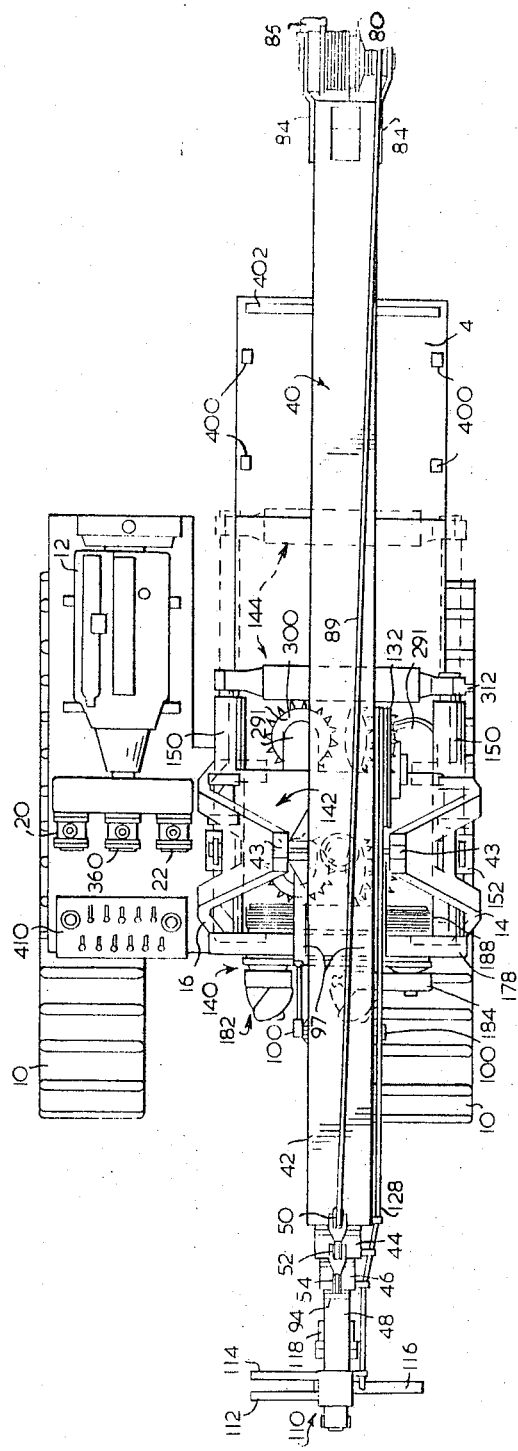
FIG. 2 is a top plan view of the machine of FIG. 1.

Referring now to the drawings, illustrating a preferred embodiment of the invention, in FIGS. 1 and 2, there is shown a machine having a base 2 and frame 4, the frame 4 being mounted for rotation on base 2 by a plurality of wheels 6 rotatably carried on suitable pins on the bottom of frame 4 and positioned for rotation in a track on base 2. Base 2 and frame 4 are carried on a tractor 8 provided with treads 10, base 2 being mounted on the tractor intermediate treads 10, and frame 4 extending outward beyond the base over treads 10 and rearward beyond the back of the treads when the machine is in its normal travelling position.

A suitable power plant 12, either a diesel or gas engine or other suitable power source, is mounted at one side of frame 4 over one of the treads 10, and, at the other side, frame 4 is provided with upwardly extending supports 14, 16. Driving units, such as hydraulic motors 18, are connected to each of the treads 10 and are powered from pumps 20, 22 driven by power plant 12, the feed to motors 18 being controlled by valves positioned in the lines between motors 18 and pumps 20, 22 respectively to regulate movement and steer tractor 8. Hydraulic motor 28, carried on frame 4 drives pinion 30 in engagement with ring gear 32 fixed to base 2, motor 28 being powered from pump 20 and controlled by a valve to rotate frame 4 about a vertical axis on base 2. Obviously, other suitable drives, well known in the art, may be substituted as driving connections between power plant 12, treads 10 and frame 4.

Referring again to FIG. 1, double acting cylinders 97, pivotally connected to supports 14, 16 respectively, are each provided with a piston and piston rod 99, pivotally connected at 100 on opposite sides of boom member 42. Cylinders 97 are connected to pump 20 through a valve to extend and retract piston and piston rods 99 in cylinders 97 pivoting boom 40 on trunions 43 to raise and lower the forward end of the boom.

Double acting cylinder 91 is fixed to boom member 42 intermediate supports 14, 16 and is provided with piston and piston rod 93. Concave guide roll 105 is rotatably mounted between a pair of Y-shaped linkages 106, 102 carried at either side of the forward end of boom 40, linkage members 102 being connected at fixed pivots 103 to the opposite sides of boom member 42 and linkage members 106 being pivoted at 95 to the forward end of piston and piston rod 93, the movement of piston and piston rod 93 in cylinder 91, through pivot 95, raising and lowering guide roll 105 with respect to boom 40. As their free ends beneath guide roll 105, linkage members 106 extend outwardly.

At its forward or telescoping end, boom 40 is provided with a grab or grapple means, generally indicated 110 (FIGS. 1 and 2) the grab or grapple means being attached to the forward end of boom member 48. Thus, as boom 40 is extended, the grapple means is extended outwardly away from the tractor end, and, as the boom is retracted, the grapple means returns inwardly toward the tractor.

The delimber of the present invention generally indicated 140, the debarker, generally indicated 142, and the shears, or knives, generally indicated 144, are supported in aligned, tandem position between supports 14, 16 on a pair of horizontally spaced tubular beams 150 and shears 144 being mounted for axial movement with respect to the beams.

Tubular beams 150 are pivotally connected to supports 14, 16 respectively, by collar members 152, fixed to each of the beams 150, a collar member 152 pivotally connecting one of the beams 150 to support 14 on a trunion fixed to the support at a point above beam 150 and an identical collar member 152 pivotally connecting the other beam 150 to support 16 at a trunion fixed to the support 16 at a trunion fived to the support at a point above the beam.

Figure 4:
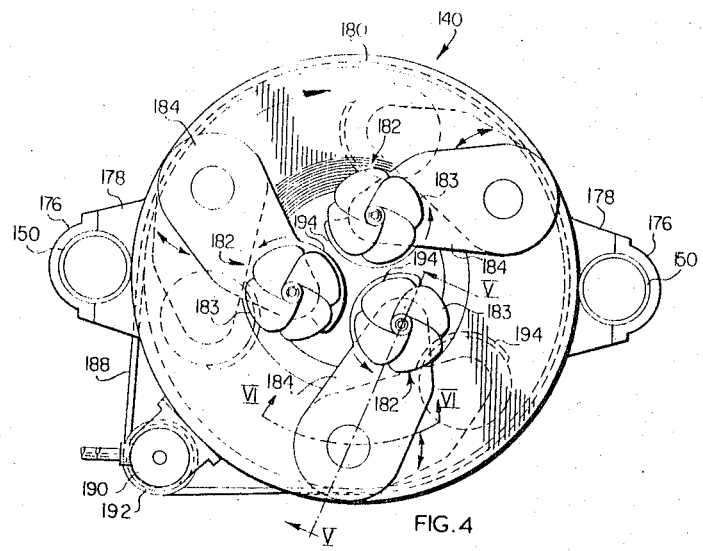
FIG. 4 is an enlarged front elevation view of the delimber of FIG. 3 with the delimber drive motor.

As shown in FIG. 4, delimber 140 is positioned vertically on tubular beams 150, the delimber being connected to the respective beams by collars 176 and includes a stationary housing 178 fixed by collars 176 to beams 150 and a rotating housing 180 carried on stationary housing 178. A plurality of cutter heads 182 are each rotatably carried on an arm 184 pivoted at 186 on rotatable housing 180. Each cutter head 182 includes a plurality of cutter blades 183, in the present instance four, spaced equidistant about a hub 185 fixed on a shaft 226 rotatably mounted on an arm 184. Housing 180 is driven by a plurality of belts 188 operatively connected to hydraulic motor 190 through pulley 192, belts 188 passing around housing 180.

Cutter heads 182 and arms 184 are operated by motor 190 through a gear arrangement in which the arms 184 are yieldingly urged inward toward the center of the delimber, a work-engaging stop 194 being carried by the inner ends of each of the arms 184 to prevent cutter heads 182 from digging into the tree trunk as the trunk is fed through the cutter heads.

Figures 5, 6:
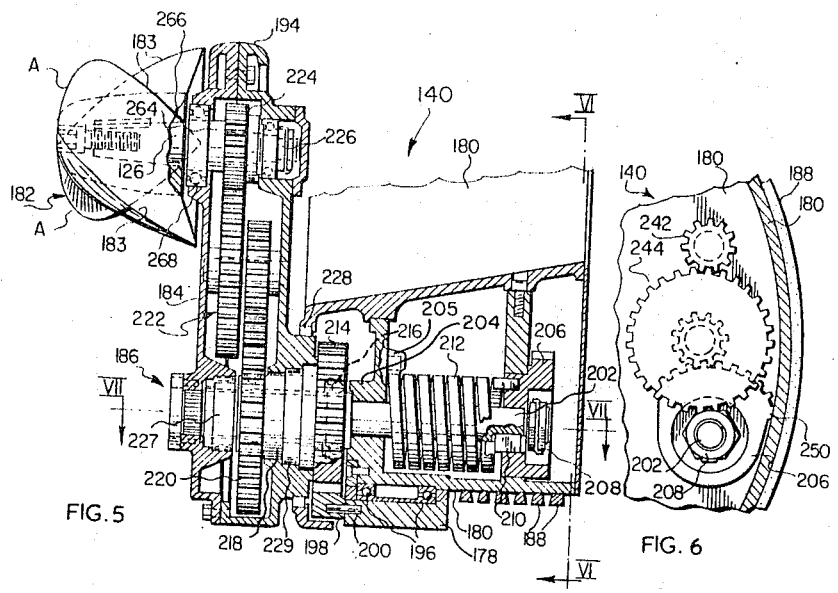
FIG. 5 is an enlarged vertical section view taken along one arm of the delimber on line V—V of FIG. 4.
FIG. 6 is a fragmentary view, in section, taken along the line VI—VI of FIG. 4 and FIG. 5.

Referring now to FIG. 5, rotatable housing 180 is supported on bearings 196 carried in stationary housing 178.

A ring gear 198 is fixed by pins 200 to the stationary housing 178. The drive for each cutter head 182 includes a shaft 202 rotatably positioned in a boss 204 formed in rotatable housing 180, gear segment 206 being keyed at 210 to one end of shaft 202 and fixed thereon by lock nuts 208. A helical spring 212 is carried on each of the shafts 202 and is fixed at one of its ends to gear segment 206 and at its other end to a lug 205 on rotary housing 180. Rotation of each of the shafts 202 in housing 180 is restrained by the action of helical spring 212.

Gears 214 are rotatably mounted on bearing 216 carried on shaft 202 adjacent boss 204, gear 214 being provided with an outwardly extending sleeve 218. Gear 220 is keyed to sleeve 218. A cluster gear 222, rotatably carried in each of the arms 184, is in engagement with gear 220 and with a gear 224 carried at the outer end of each of arms 184. Gear 224 is keyed to shaft 226 of cutter head 182. Intermediate gear 224 and cutter head 182, shaft 226 is provided with a hub 264 rotatably supporting shaft 226 and cutter head 182 in bearing 268 fixed in arm 184. A shoulder 266 is fixed to shaft 226 as a thrust surface to limit inward movement of head 182 on arm 184. A spline at the forward end of shaft 202 connects arm 184 to shaft 202. Arm 184 is pivotally supported on shaft 202 by means of bearings 227 and 229 and is provided with a seal 228 affixed to the housing.

When the rotatable housing 180 is rotated in one direction by motor 190 and belts 188, through the gear train between ring gear 198 and cutter heads 182, the cutter heads 182 are rotated and spring 212 yieldably presses work engaging stop 194 and cutter heads 182 toward the center of the delimber as viewed in FIG. 4.

As shown in FIGS. 6, 7, 8 and 9, to move arms 184 and cutter heads 182 away from each other to open the heads to receive a tree trunk, the gear train is rotated in a direction opposite to that previously described. A shaft 240 is mounted in housing 180 parallel to shaft 202 and is provided at its rearward end with a gear 242 in driving engagement with cluster gear 244 which in turn is in driving contact with the gear teeth of gear segment 206. At its forward end, shaft 240 is connected through a one-way clutch 246 and gear 248 with ring gear 198. When motor 190 is turning ring gear 198 in a clockwise direction as viewed in FIG. 4, driving heads 182 and pivoting arms 184 inward, clutch 246 is disengaged, shaft 240 and gears 242, 244 remaining inoperative. When motor 190 is reversed, turning ring gear 198 in a counterclockwise direction, clutch 246 engages, causing shaft 240 and gears 242, 244 to turn gear segment 206. Through shaft 202 keyed to gear segment 206, arms 184 and cutter heads 182 are moved outwardly away from each other providing a larger opening for introduction of a tree trunk to be delimbed and processed in the machine.

As best shown in FIG. 6, rotation of gear segment 206 is limited by the contact of stop 250 on gear segment 206 with housing 180, a suitable hydraulic by-pass being provided in hydraulic motor 190 to permit it to stall the motor when stop 250 contacts housing 180. As soon as the tree trunk is positioned between the cutter heads, motor 190 is reversed disengaging clutch 246. Arm 184 is then free to return inwardly to engage surface 194 and heads 182 with the tree trunk.

In operation, a tree is fed axially through the delimber assembly by a suitable feed means while housing 180 is rotated clockwise as viewed in FIG. 4, carrying arms 184 and cutter heads 182 clockwise around the tree. At the same time, each of the delimber cutter heads 182 is rotating counterclockwise on its shaft 226 at a relatively high speed. The cutter head guides 194, which trail the blades 183 on each head in their clockwise rotation with housing 180, follow the surface contours of the tree trunk under the influence of the springs 212. Thus, each of the rotating cutter heads 182 scans or sweeps a generally spiral path closely adjacent to and about the tree trunk. The blades 183 of each cutter head 182 are so shaped that in their rotation about their shafts 226 a portion thereof sweeps out a generally cylindrical volume the surface of which is maintained generally parallel to and in close spaced rotation with the surface of the tree trunk. These portions of the cutter blades 183 are long enough axially so that the aforementioned spiral paths overlap to some extent thereby insuring that at the rate the tree is fed and housing 180 is rotated, any projection such as a tree limb which escapes the effective cylindrical cutting periphery of one rotating head will be intercepted by the next cutter head.

Figure 3:
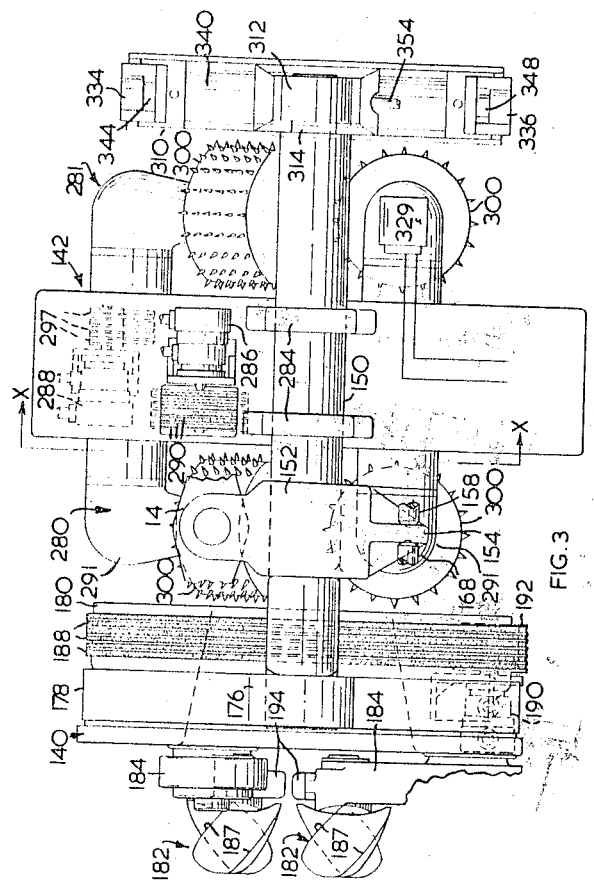
FIG. 3 is an enlarged side elevation view of one embodiment of the delimber of the present invention, together with a debarker and a shear.
Figure 10:
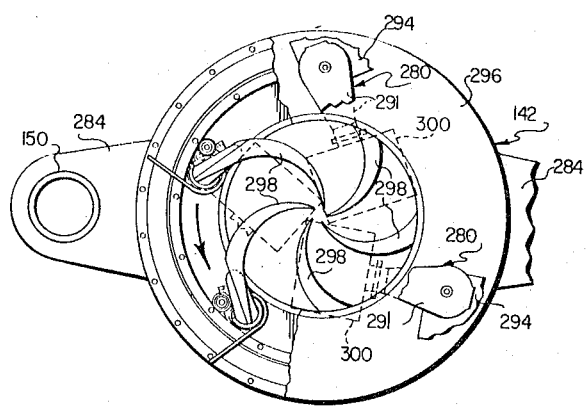
FIG. 10 is a front elevation view, partly in section, of the debarker of FIG. 3 and feed roll mechanism, taken along the line X—X of FIG. 3.

Referring to FIGS. 3 and 10, debarker 142 and feed roll mechanisms 280, 281 are positioned behind delimber 142 on tubular beams 150, and are connected to the respective beams by collars 284. Any suitable debarker and feed roll mechanism may be employed. However, the debarker and feed roll mechanism shown in U.S. Patent No. 2,857,945 to P. G. Brundell et al., dated October 28, 1958, is preferred. In utilizing this debarking and feed roll mechanism, it has been found desirable to provide separate power sources for the debarker and the feed rolls. Thus, a motor, such as hydraulic motor 286, is provided to drive the feed roll mechanisms 280, 281, and a motor, such as hydraulic motor 288, to drive debarker 142. These motors are connected to the feed roll mechanism and the debarker by pulleys and V-belts 290, 292, respectively.

Debarker 142 includes stationary housing 294 fixed to beams 150 by collars 284 and rotatable housing 296, carrying a plurality of arcuate blades 298, rotatable housing 296 being driven by motor 288 in driving connection with the housing through pulley and V-belts 292.

Feed roll mechanism 280, 281 each comprise a triangulated arrangement of three spiked rolls 300, the three spiked rolls of mechanism 280 being positioned at the forward or infeed side of debarker 142 and the spiked rolls of mechanism 281 being positioned at the outfeed side of the debarker. Each spiked roll 300 is journaled for rotation about an axis parallel to the infeed and outfeed sides of the debarker at one end of an L-shaped arm 291 pivotally supported at its opposite end on stationary housing 294. Arms 291 are spaced around housing 294 and through a driving arrangement, such as shown in U.S. Patent 2,857,945, spiked rolls 300 are driven and arms 291 are pivoted on housing 294 to drivingly engage the peripheral spiked surface of rolls 300 with a tree trunk positioned between the rolls. Thus, feed roll mechanisms 280, 281 are driven by motor 286 and pulley and V-belts 290 and, as a tree trunk is positioned between the rolls 300, mechanism 280 feeds the trunk into debarker 142, mechanism 281 receiving and removing the debarked trunk from the debarker.

In normal operation, motor 286 and pulley and V-belts 290 rotate rolls 300 on feed roll mechanism 280 toward, and rolls 300 on feed roll mechanism 281 away from, debarker 142, feed roll mechanism 281 feeds the tree out of debarker 142.

As aforestated, the various units of the machine are operated, preferably, from a central control point, such as from the operator's station on the tractor shown in FIG. 2 of the drawings, a control panel 410, such as shown in FIG. 2 being employed for this purpose. The control systems for the delimber, debarker and feed rolls are shown schematically in FIG. 16. Power for the various units is provided from a pump or pumps driven from tractor motor 12. For ease of operation, a plurality of pumps is preferred. In the embodiment of the invention illustrated in the attached drawings, three pumps 20, 22, 360 are employed.

Figure 16:
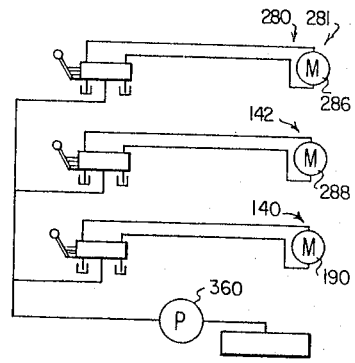
FIG. 16 is a schematic diagram of the power units and controls for the delimber of FIGS. 3–9, and including the debarker and the shear controls.

As diagrammatically shown in FIG. 16, pump 360 furnished power to motor 286 on feed mechanisms 280, 281, debarker motor 288 and delimber motor 190. Between the respective pump and each of the operating units an appropriate manual operated valve is provided for manual control of the operation of the respective unit.

Turning now to FIG. 11, there is shown the delimber of another aspect of the present invention, indicated generally at 500, on a combined machine such as that disclosed and claimed in pending application Serial No. 40,294. The combine includes the delimber 500, feed rollers 501 to draw logs through the delimber and to a debarker 504, feed rollers 502 to force the delimbed and debarked logs through a guillotine type shears 503. These latter units, forming no part of the present invention, will not be further described herein.

Figure 12:
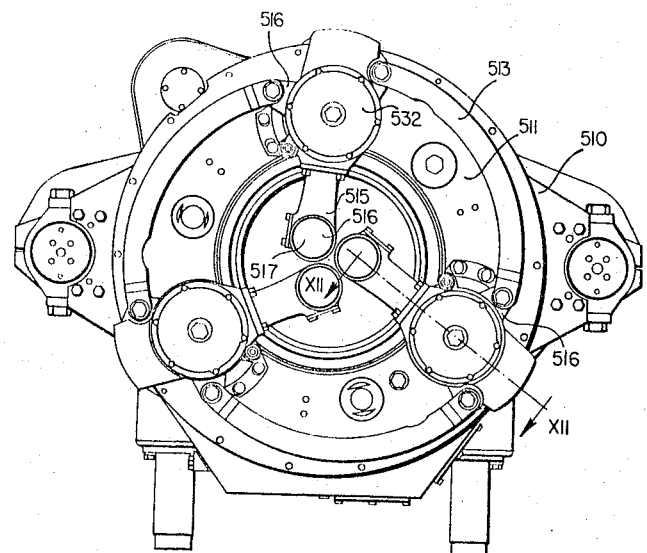
FIG. 12 is a front elevational view of the assembly of FIG. 11, taken along the line XII—XII showing mainly the delimber.
Figure 13:
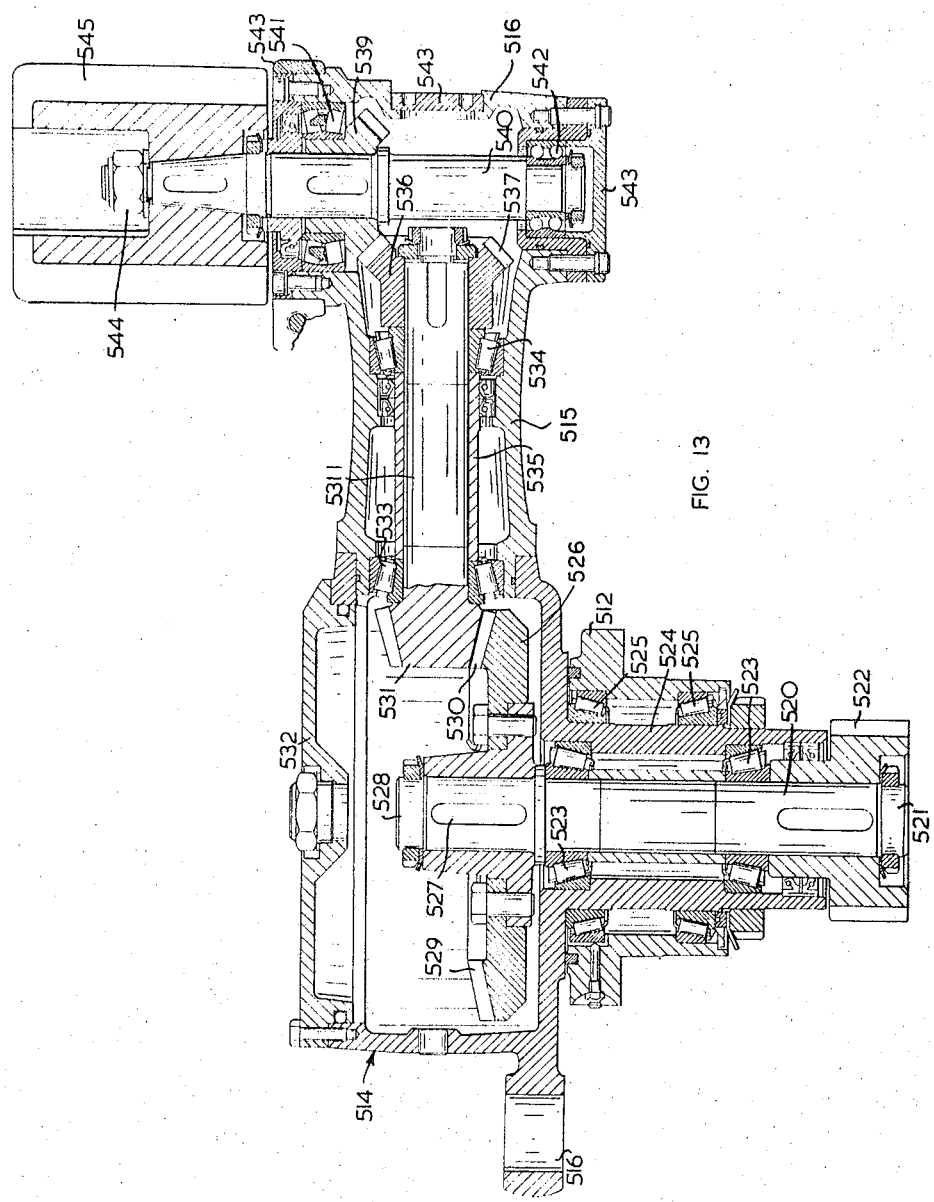
FIG. 13 is a vertical sectional view taken along one arm of the delimber along line XIII—XIII of FIG. 12.

The delimber will now be more fully described with reference to FIG. 12. In FIG. 12, there is shown a fixed annular housing 510 within which is mounted a rotatable annular housing 511. Fixed to the rotatable annular housing 511 are three bearing housings 512 (see FIG. 13), spaced 120° apart. A primary drive shaft 520 is located within housing 512. Splined to shaft 520 and retained by means of a lock nut assembly 521 is a drive sprocket 522. It is noted that shaft 520 is rotatably mounted generally within housing 512 by means of a pair of roller thrust bearings 523. Concentrically rotatably mounted around shaft 520 and within housing 512 is a collar 524, which is, in effect, an integral hollow extension of housing 514. Collar 524 is rotatably mounted within housing 512 by means of a pair of thrust collar bearings 525. Collars 524 are each provided with ears 516 by which the collars may be interconnected by arcuate linkage arms 513.

A bevel gear 526 is ridgidly secured to shaft 520 by means of key 527 and nut 528. Teeth 529 of bevel gear 526 mesh with teeth 530 on bevel gear 531, which is secured to shaft 5311. Bevel gears 526 and 531 are located within housing 514. Housing 514 is provided with a removable face plate 532, held in place by conventional means.

Arm housing 515 is connected to housing 514. Within arm housing 515 at the juncture with housing 514 is a roller thrust bearing 533, while at the other end of arm housing 515 is another thrust roller bearing 534. Bearings 533 and 534 serve rotatably to mount shaft 5311 within arm housing 515. A spacer 535 also surrounds shaft 531.

Another bevel gear 536 is rigidly secured to shaft 5311, in the housing 516. Teeth 537 on bevel gear 536 mesh with teeth 538 on drive bevel gear 539. Bevel gear 539 is secured by conventional means to outer shaft 540 which is rotatably mounted within arm housing 516 by thrust roller bearings 541 and ball bearings 542. Arm housing 516 is provided with a number of access face plates 543, detachably secured thereto by conventional means. Secured to the shaft 540 by conventional means, i.e., lock nut 544 is a cutter head 545.

Figure 14:
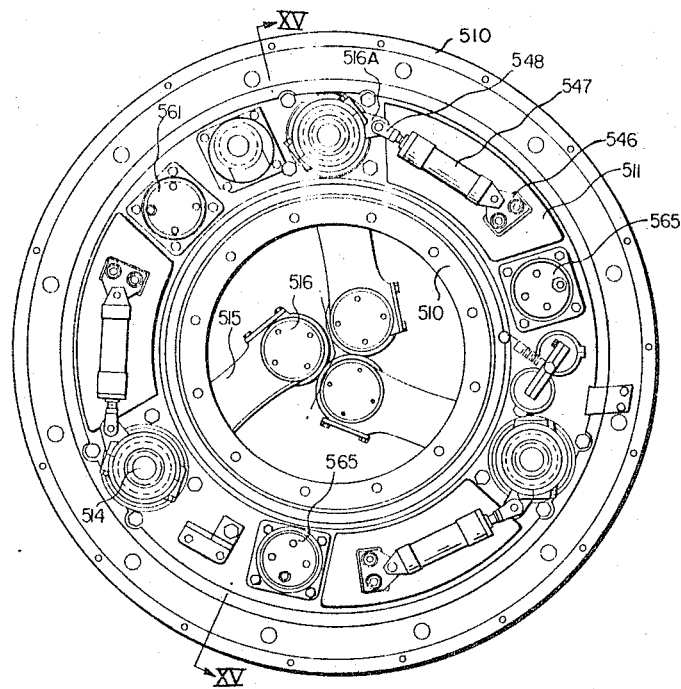
FIG. 14 is an elevational view of the delimber of FIG. 11 taken along the line XIV—XIV of FIG. 10 showing mainly the disposition of the hydraulic components of its control system.
Figure 15:
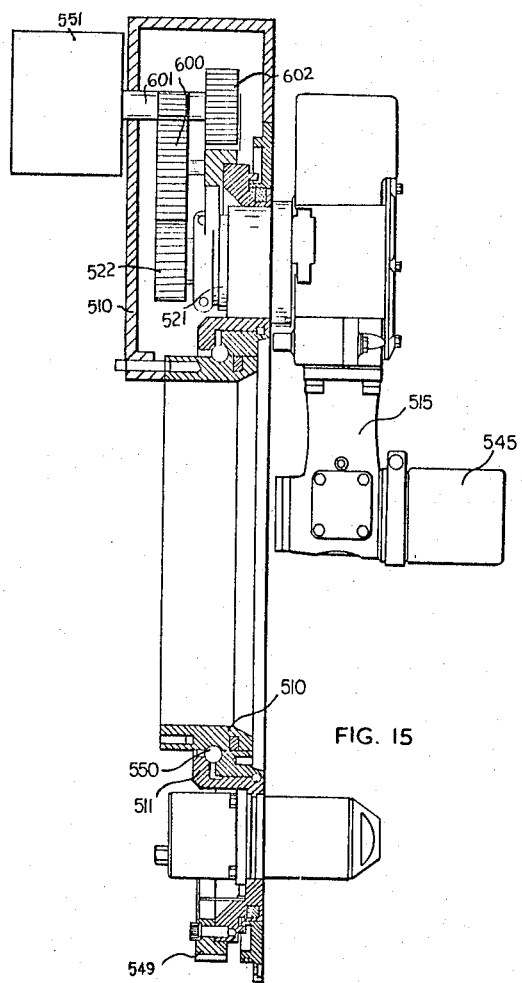
FIG. 15 is a vertical sectional view taken along the line XV—XV of FIG. 14.

Turning now to FIGS. 14 and 15 there is shown a portion of the fixed annular housing 510 and a portion of the rotor 511. Mounted on the rotor and connected thereto is the cylinder end of a hydraulic cylinder 547. The rod end 548 of the hydraulic cylinder is connected to the ear 516A of the rotatable collar 524. Also shown in FIG. 14 are the two hydraulic accumulators 565 and tank 561 which will be described hereinafter with reference to FIG. 17.

FIG. 15 shows a ring gear 549 rigidly secured by conventional means to the rotor 511 which is in turn rotatably mounted on stator by ball bearing 550.

In operation, actuation of the motor 551 (see FIG. 11) drives rotor 511 through pinion 602 engaging the ring gear 549. Pinion 522 engages with an internal ring gear 600 which is fixed to annular housing 510. As pinion 522 is carried with the rotating housing, its engagement with 600 causes it to rotate and in turn to rotate shaft 520 and ultimately, cutter 545.

To control the portion of the cutters 545, it is necessary to rotate the cutter arms (i.e., arm housing 515). This is accomplished by actuation of cylinders 547. This causes ears 516 to move and hence to rotate collar 524 and thereby to rotate arm 515. Since the three housings 514 are interlinked by arcuate linkages 513, the cutters 545 move equally. However, the present invention also contemplates individual control of cutters 545 by disconnecting the arcuate linkages 513.

Figure 17:
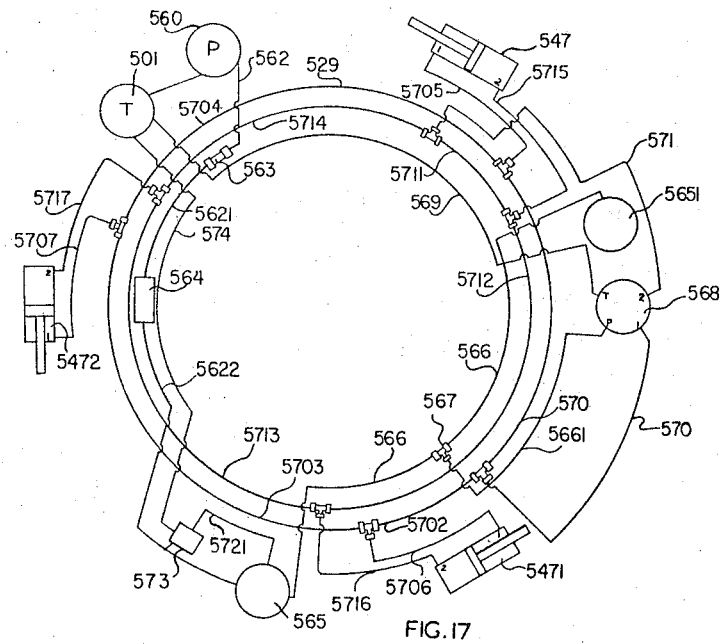
FIG. 17 is a schematic diagram of the hydraulic control system of FIG. 14.

Turning now to FIG. 17, there is shown a pump 560 connected to a storage tank 561. Hydraulic fluid is pumped via line 562 through valve 563, line 5621, through filter 564 and then via line 5622 to the input of a hydraulic accumulator 565. From the output of the hydraulic accumulator 565 a line 566 leads through T-junction 567 and thence, via line 566 to another accumulator 5651 and via line 5661 to a 4-way valve 568. This valve may connect line 5661 (a "pump" line) either to line 569 (a "tank" line), or to line 570 (which is a No. 1 inlet to hydraulic cylinder 547) or to line 571 (which is a No. 2 inlet line to the hydraulic cylinder 547).

Thus, line 570 leads to four main segments, 5701, 5702, 5703, and 5704, which respectively lead to lines 5705 to No. 1 inlet of cylinder 547; line 5706 to No. 1 inlet of cylinder 5471 and 5707 to No. 1 inlet of cylinder 5472. Similarly, line 571 leads to four main segments 5711, 5712, 5713 and 5714 which, respectively, lead to line 5715 to No. 2 inlet of cylinder 547; line 5716 to No. 2 inlet of cylinder 5471; and line 5717 to No. 2 inlet of cylinder 5472.

Pump 560 draws oil from tank 561, delivers it through check 563 filter 564 into accumulators 565 and 5651 which in turn, are relieved to tank by relief valve 573. Discharge from accumulators and pump are jointly controlled through 4-way valve 568 which can permit oil to be delivered to cylinders 547, 5471 and 5472 to either rod or head end. The purpose of the accumulators is to augment the flow of the pump for fast cycling. They are replenished by the pump between cycles, excess oil being relieved over 573 when the accumulators are full.

The actuation of 4-way valve 568 is accomplished by means of a fly ball mechanism which is responsive to the rotation of the main housing. The fly ball is biased towards the axis of the delimber when the delimber is stationary, by a spring. Centrifugal force throws the ball and thus the valve in the opposite position upon rotation of the delimber.

I claim:

1. A delimber comprising: an annular like housing fixed to a support means and encircling a linear feed path; said annular housing carrying a plurality of rotatable supports; the supports spaced circumferentially around said housing, an arm fixed to each of said supports, the opposite ends of each of said arms being movable towards and away from said feed path by rotation of said supports and carrying delimbing means thereon and means for rotating each of said plurality of supports in one direction for moving said arms towards said feed path and in another direction for moving said arms away from said feed path.

2. A delimber comprising: an annular like housing fixed to a support means and encircling a linear feed path, said annular housing carrying a plurality of rotatable shafts, the shafts being spaced circumferentially around said housing, an arm fixed to each of said shafts, the opposite end of each of said arms being movable towards and away from said feed path by rotation of said shafts; delimbing means carried on said arms; and means for rotating each of said plurality of shafts in one direction for moving said arms toward said feed path and in another direction for moving said arms away from said feed path.

3. A delimber comprising: a support means; means supported by said support means for feeding a felled tree along a substantially linear feed path; an annular housing mounted on said support means, and encircling said linear feed path; a plurality of secondary housings mounted on said annular housing, said secondary housings being circumferentially spaced around said annular housing and projecting therefrom; a plurality of shafts, each shaft being rotatably mounted at one end within one of said secondary housings and having a free end projecting therefrom; means for rotating said shafts; a cutter head fixed to the free end of each of said shafts for rotation therewith; means for moving said secondary housings in a first direction; means responsive to said movement in said first direction for moving said cutter heads toward said linear path into engagement with a felled tree in said path; means for moving said secondary housings in a second direction; and means responsive to said movement in said second direction for moving said cutter heads away from said linear path and out of engagement with a felled tree in said path.

4. The delimber of claim 3 in which said cutter heads have blades spaced equidistant around said cutter head and extending spirally along the surface of said cutter head.

5. In a machine for processing a felled tree; support means; means supported thereby for feeding a tree axially along a substantially linear path; a first annular housing fixed to said support means and encircling said linear path; a second annular housing rotatably mounted on said first housing and encircling said linear path for rotation about the axis thereof; a plurality of shafts mounted in said second housing for rotation about an axis in spaced, substantially parallel alignment with the axis of said linear path, said shafts being spaced circumferentially around said second housing and having one end projecting therefrom; a plurality of arms, each of said plurality of arms being keyed in a fixed position adjacent one of its ends to the projecting end of each of said shafts with its opposite end movable toward and away from the axis of said linear path by the rotation of said shaft to which said arm is fixed in said second housing, each of said arms having a second shaft rotatably mounted at its opposite end on an axis parallel to the axis of said linear path; a cutter head fixed to each of said second shafts movable toward and away from the axis of said linear path as said arm is rotated; means responsive to the rotation of said second housing for urging said arms toward and away from the axis of said linear path; means responsive to the rotation of said plurality of shafts in a second direction for urging said second housing about the axis of said linear path; and means responsive to the rotation of said second housing for rotating said second shaft and said cutter head about said axis parallel to the axis of said linear path.

6. The machine as claimed in claim 5 wherein said second shaft and said cutter head rotate about its axis in a direction opposite to the direction of rotation of said second housing.

7. The machine as claimed in claim 5 wherein said means for urging said arms toward the axis of said linear path include: a spring carried on each of said plurality of shafts for normally urging the arm fixed to each of said shafts toward the axis of said linear path as said second housing is rotated in a first direction; and means responsive to the rotation of said second housing in an opposite direction for rotating said shaft and said arm in a direction away from the axis of said linear path to move the cutter heads outward away from such axis.

8. In a delimber: support means; means supported thereby for feeding a tree along a substantially linear feed path; an annular housing rotatably mounted on said support means and encircling said feed path; a plurality of first shafts circumferentially spaced about said housing; a plurality of arms each of said plurality of arms being secured adjacent one of its ends to an associated one of said first shafts; means for rotation of said annular housing in a first direction; means responsive to the rotation of said annular housing in said first direction for rotating said first shafts and for moving said arms which are secured thereto radially outward; a plurality of second shafts, one rotatably mounted on each of said arms and movable radially relative to said housing with rotation of said arms, each of said second shafts being substantially parallel to the axis of said feed path; resilient means acting on said first shafts biasing said arms to carry said second shafts radially inward; means for rotating said first shafts; a plurality of cutter heads one fixed to each of said shafts and including a plurality of cutter blades disposed about the associated cutter shaft; and guide means associated with each of said cutter heads for limiting the approach of said cutter blades to a tree felled along said path to a predetermined distance from the surface bark of said tree.

9. In a delimber: support means; means supported thereby for feeding a tree along a substantially linear feed path; an annular housing rotatably mounted on said support means and encircling said feed path; a plurality of first shafts circumferentially spaced about said housing; a plurality of arms, each of said plurality of arms being secured adjacent one of its ends to an associated one of said first shafts; means for rotation of said annular housing in a first direction; means responsive to the rotation of said annular housing in said first direction for rotating said first shafts and for moving said arms which are secured thereto radially outward; a plurality of second shafts, one rotatably mounted on each of said arms and movable radially relative to said housing with rotation of said arms, each of said second shafts being substantially parallel to the axis of said feed path; resilient means acting on said first shafts biasing said arms to carry said first shafts radially inward; means for rotating said first shafts; a plurality of cutter heads one fixed to each of said shafts and including a plurality of cutter blades disposed about the associated shaft; guide means associated with each of said cutter heads for limiting the approach of said cutter blades to a tree fed along said path to a predetermined distance from the surface bark of said tree; and means pivotally supporting said support means for limited vertical rotation about a horizontal axis transverse to said feed path.

10. In a delimber: a support means; means supported thereby for feeding a tree along a substantially linear feed path; an annular housing rotatably mounted on said support means and encircling said feed path; a plurality of first shafts circumferentially spaced about said housing; a plurality of arms, each of said plurality of arms being secured adjacent one of its ends to an associated one of said first shafts; means for rotating said annular housing in a first direction; means responsive to the rotation of said annular housing in said first direction for rotating said first shafts and for moving said arms which are secured thereto radially outward; a plurality of hubs, one rotatably mounted on each of said arms spaced from its pivot and movable generally radially relative to said feed path with rotation of said arms about their pivots, each of said hubs having an axis of rotation extending substantially parallel to the axis of said feed path; resilient means acting on said first shafts biasing said arms to carry said hubs radially inward; means for rotating said annular housing at one speed and for rotating said hubs at a substantially greater speed; a plurality of cutter blades disposed about each of said hubs; guide means associated with each of said hubs for limiting the approach of said cutter blades to a tree fed along said path to a predetermined distance from the surface of said tree; and means acting on said first shafts for rotating said arms about their pivots to carry said hubs and the cutter blades carried thereby radially outward from said axis.

11. In a delimber: support means; means supported thereby for feeding a tree along a substantially linear feed path; an annular housing rotatably mounted on said support means and encircling said feed path; a plurality of first shafts circumferentially spaced about said housing; a plurality of arms, each of said plurality of arms being secured adjacent one of its ends to an associated one of said first shafts; means for rotation of said annular housing in a first direction; means responsive to the rotation of said annular housing in said first direction for rotating said first shafts and for moving said arms which are secured thereto radially outward; a plurality of second shafts, one rotatably mounted on each of said arms spaced from its pivot and movable generally radially relative to said feed path with rotation of said arms about their pivots, each of said second shafts extending substantially parallel to the axis of said feed path; resilient means acting on said first shafts biasing said arms to carry said first shafts radially inward; means for rotating said annular housing at one speed and for rotating said second shafts at a substantially greater speed; a plurality of cutter heads one fixed to each of said second shafts and including a plurality of cutter blades disposed about the associated shaft; guide means associated with each of said cutter heads for limiting the approach of said cutter blades to a tree fed along said path to a predetermined distance from the surface of said tree; and means acting on said first shafts for rotating said arms about their pivots to carry said shafts and the cutter heads carried thereby radially outward from said axis.

12. In a delimber support means; means supported thereby for feeding a tree along a substantially linear feed path; an annular housing rotatably mounted on said support means and encircling said feed path; a plurality of first shafts circumferentially spaced about said housing, a plurality of arms, each of said plurality of arms being secured adjacent one of its ends to an associated one of said first shafts; means for rotation of said annular housing in a first direction; means responsive to the rotation of said annular housing in said first direction for rotating said first shafts and for moving said arms which are secured thereto radially outward; a plurality of hubs, one rotatably mounted on each of said arms spaced from its pivot and movable generally radially relative to said feed path with rotation of said arms about their pivots, the axis of rotation of each of said hubs relative to its arms extending substantially parallel to the axis of said feed path; an elongated cutter blade on each of said hubs extending radially from and longitudinally along each of said hubs, each of said blades having a cutting edge shaped such that a portion of each generates a cylindrical surface of revolution as it rotates about the axis of its hub; resilient means acting on said first shafts biasing said arms to carry said hubs radially inward; means for rotating said annular housing at one speed and for rotating said hubs at a substantially greater speed; and guide means associated with each of said hubs for limiting to a predetermined distance the approach of the cutting edges of said blades to the surface of a tree fed along said path.

13. In a delimber: support means, means supported thereby for feeding a tree along a substantially linear feed path; an annular housing rotatably mounted on said support means and encircling said feed path; a plurality of first shafts circumferentially spaced about said housing; a plurality of arms, each of said plurality of arms being secured adjacent one of its ends to an associated one of said first shafts; means for rotation of said annular housing in a first direction; means responsive to the rotation of said annular housing in said first direction for rotating said first shafts and for moving said arms which are secured thereto radially outward; a plurality of hubs, one rotatably mounted on each of said arms spaced from its pivot and movable generally radially relative to said feed path with rotation of said arms about their pivots; means for rotating said annular housing in one direction and for rotating said hubs in the opposite direction at a substantially greater speed for delimbing a tree fed along said path, the axis of rotation of each of said hubs extending substantially parallel to the axis of said feed path; an elongated cutter blade on each of said hubs extending radially from and longitudinally along each of said hubs, each of said blades having a cutting edge shaped such that a portion of each generates a cylindrical surface of revolution as it rotates about the axis of its hub, said hubs each having a forward end presented toward the direction from which a tree is fed along said path, each of said blades extending angularly partially about its hub in the direction opposite to that in which said hub is rotated; resilient means acting on said first shafts biasing said arms to carry said hubs radially inward; and guide means associated with each of said hubs for limiting the approach of the cutting edges of said blades to a tree fed along said path to a predetermined distance from the surface of said tree.

14. In a delimber: support means; means suported thereby for feeding a tree along a substantially linear feed path; an annular housing rotatably mounted on said support means and encircling said feed path; a plurality of first shafts circumferentially spaced about said housing; a plurality of arms, each of said plurality of arms being secured adjacent one of its ends to an associated one of said first shafts; means for rotation of said annular housing in a first direction; means responsive to the rotation of said annular housing in said first direction for rotating said first shafts and for moving said arms which are secured thereto radially outward; a plurality of hubs, one rotatably mounted on each of said arms spaced from its pivot and movable generally radially relative to said feed path with rotation of said arms about their pivots; means for rotating said annular housing in one direction and for rotating said hubs in the opposite direction at a substantially greater speed for delimbing a tree fed along said path, the axis of rotation of each of said hubs extending substantially parallel to the axis of said feed path; an elongated cutter blade on each of said hubs extending radially from and longitudinally along each of said hubs, each of said blades having a cutting edge shaped such that a portion of each generates a cylindrical surface of revolution as it rotates about the axis of its hub, said hubs each having a forward end of reduced diameter presented toward the direction from which a tree is fed along said path, each of said blades extending angularly partially about its hub in the direction opposite to that in which said hub is rotated with said portion thereof extending helically, the portion of each of said cutting edges forward of said portion thereof extending longitudinally and radially inward and merging with its hub adjacent to said reduced diameter forward end thereof; resilient means acting on said first shafts biasing said arms to carry said hubs radially inward; and guide means associated with each of said hubs for limiting the approach of the cutting edges of said blades to a tree fed along said path to a predetermined distance from the surface of said tree.

15. In a delimber: support means; means supported thereby for feeding a tree along a substantially linear feed path; an annular housing rotatably mounted on said support means and encircling said feed path; a plurality of first shafts circumferentially spaced about said housing; a plurality of arms, each of said plurality of arms being secured adjacent one of its ends to an associated one of said first shafts; means for rotation of said annular housing in a first direction; means responsive to the rotation of said annular housing in said first direction for rotating said first shafts and for moving said arms which are secured thereto radially outward; a plurality of hubs, one rotatably mounted on each of said arms spaced from its pivot and movable generally radially relative to said feed path with rotation of said arms about their pivots, means for rotaing said annular housing in one direction and for rotating said hubs in the opposite direction at a substantially greater speed for delimbing a tree fed along said path, the axis of rotation of each of said hubs extending substantially parallel to the axis of said feed path; an elongated cutter blade on each of said hubs extending radially from and longitudinally along each of said hubs, each of said blades having a cutting edge shaped such that a portion of each generates a cylindrical surface of revolution as it rotates about the axis of its hub, said hubs each having a forward end presented toward the direction from which a tree is fed along said path, each of said blades extending angularly partially about its hub in the direction opposite to that in which said hub is rotated with said portion thereof extending helically, the portion of each of said cutting edges forward of said portion thereof extending radially inward to merge with its hub along an arcuate path shaped so that it describes a substantially hemispherical surface of revolution having a radius substantially equal to that of said cylindrical surface; resilient means acting on said first shafts biasing said arms to carry said hubs radially inward; and guide means associated with each of said hubs for limiting the approach of the cutting edges of said blades to a tree fed along said path to a predetermined distance from the surface bark of said tree.

16. In a delimber: means for supporting and feeding a tree axially along a substantially linear feed path; an annular housing mounted on said support means and encircling said linear feed path, said annular housing carrying a plurality of rotatable collars spaced circumferentially around said feed path and having one end thereof projecting from said housing; a plurality of arms, each of said arms being fixed at one of its ends to respective ones of said collars, the opposite end of the arm being movable towards and away from the feed path by rotation of its respective collar, a second shaft rotatably mounted on said opposite end of said arm, delimbing means carried by each of said second shafts; and means for rotating each of said collars in one direction for moving said delimbing means towards said feed path and in another direction for moving said delimbing means away from said feed path.

17. In a delimber: means for supporting and feeding a tree axially along a substantially linear feed path; an annular housing mounted on said support means and encircling said linear feed path; said annular housing carrying a plurality of rotatable collars spaced circumferentially around said feed path and having one end thereof projecting from said housing; a plurality of arms each of said arms being fixed to the projecting end of respective ones of said collars, the opposite end of each of said arms being movable towards and away from the feed path by rotation of its respective collars; a rotatably mounted cutter head carried by each of said arms adjacent said opposite end thereof; and means for rotating each of said collars in one direction for moving said cutter heads towards said feed path and in another direction for moving said cutter heads away from said feed path.

18. In a delimber: support means; means supported thereby for feeding a selected tree axially along a substantially linear feed path; an annular housing mounted on said support means and encircling said linear feed path; a plurality of secondary housings mounted on said annular housing, said secondary housings being circumferentially spaced around said linear feed path and having one end thereof projecting from said annular housing; a plurality of shafts, each shaft being rotatably mounted at one end within its associated such secondary housing, and having a free end projecting therefrom; means for rotating said shafts; a cutter head fixed to the free end of each said shaft for rotation therewith; and means engaging and linked to said secondary housings for selectively and positively moving said housings, and consequently, said cutter heads, towards and away from the axis of said linear path.

19. The machine of claim 18 wherein said delimber comprises: a first annular housing fixed to said support means and encircling said linear path; a second annular housing rotatably mounted on said first housing and encircling said linear path for rotation about the axis thereof; a plurality of shafts each rotatably mounted within a collar which is mounted in said second housing; said shafts being mounted for rotation about an axis in spaced, substantially parallel alignment with the axis of said linear path, said shafts being spaced circumferentially around said second housing and having one end projecting therefrom; a plurality of arms, each of said plurality of arms being fixed adjacent one of its ends to the projecting end of each of said shafts with its opposite ends movable toward and away from the axis of said linear path as said collar in which it is rotatably mounted is rotated in said second housing; each of said arms having a second shaft rotatably mounted at its opposite end on an axis parallel to the axis of said linear path; a cutter head fixed to each of said second shafts movable toward and away from the axis of said linear path as said arm is rotated; means associated with said collars for urging said arms toward the axis of said linear path; actuatable means associated with said collars for urging said arms away from the axis of said linear path; means for rotating said second housing about an axis of said linear path; and means responsive to the rotation of said second housing for rotating said second shaft and said cutter head about said axis parallel to the axis of said linear path.

20. The delimber of claim 19 wherein said second shaft and said cutter head rotate about its axis in a direction opposite to the direction of rotation of said second housing.

21. The delimber of claim 19 wherein said means for urging said arms toward the axis of said linear path includes a hydraulic cylinder connecting said collar to said second annular housing for normally urging the arm fixed to each of said collars toward the axis of said linear path and means actuatable to rotate said collar and said arm to which it is attached in a direction away from the axis of said linear path to move the cutter heads outward away from such axis.

22. The delimber of claim 17 wherein said means for urging said arms toward the axis of said linear path includes a hydraulic cylinder connecting said collar to said second annular housing for normally urging the arm fixed to each of said collar toward the axis of said linear path and means actuatable to rotate said collar and said arm to which it is attached in a direction away from the axis of said linear path to move the cutter heads outward away from such axis.

23. The delimber of claim 17 wherein said collars are interlinked by arcuate linkage bars.

24. The delimber of claim 21 wherein said collars are interlinked by arcuate linkage bars.

25. The delimber of claim 22 wherein said collars are interlinked by arcuate linkage bars.

26. The delimber of claim 19 wherein said delimber comprises: an annular housing rotatably mounted on said support means and encircling said feed path; a plurality of collars spaced circumferentially about said housing for rotation therewith and also for independent rotation; a plurality of hollow arms, each said arm being fixed to an associated said collars; a plurality of rotatable shafts, each being concentrically mounted within an associated said collar; a bevel gear mounted at one end of each of said shafts; a second bevel gear meshing with said first bevel gear and secured to a third shaft, rotatably mounted within an associated one of said hollow arms; a third bevel gear fixed to said third shaft; a fourth bevel gear meshing with said third bevel gear and fixed to an associated one of a plurality of fourth shafts movable radially relative to said housing; each of said fourth shafts being substantially parallel to the axis of said feed path; hydraulic means urging said arms to carry said fourth shafts radially inward; means for rotating all of said shafts; a plurality of cutter heads one fixed to each of said fourth shafts and including a plurality of cutter blades disposed about the associated shaft; and hydraulic means actuatable to rotate said collars in one direction for urging said arms to carry said fourth shafts radially outward.

27. The delimber of claim 17 wherein said annular housing is rotatably mounted on said support means and said plurality of collars rotate therewith and also are mounted for further independent rotation, each of said arms being fixed to an associated one of said collars and being hollow, the drive for said cutter heads comprising; a plurality of rotatable shafts, each being concentrically mounted within an associated one of said collars; a bevel gear mounted at one end of each of said shafts; a second bevel gear meshing with said first bevel gear and secured to a third shaft, rotatably mounted within an associated one of said hollow arms; a third bevel gear fixed to said third shaft; a fourth bevel gear meshing with said third bevel gear and fixed to an associated one of a plurality of fourth shafts movable radially relative to said housing; each of said fourth shafts being substantially parallel to the axis of said feed path; hydraulic means urging said arms to carry said fourth shafts radially inward; means for rotating all of said shafts; a plurality of cutter heads one fixed to each of said fourth shafts and including a plurality of cutter blades disposed about the associated shaft; and hydraulic means actuatable to rotate said collars in one direction for urging said arms to carry said fourth shafts radially outward.

28. The delimber of claim 19 including means pivotally supporting said support means for limited vertical rotation about a horizontal axis transverse to said feed path.

29. The delimber of claim 28 wherein said means pivotally supporting said support means is adapted to be pivoted under the influence of forces applied by a tree during a passage of said tree therethrough so that said feed path is free to follow the inclination to the horizontal of a tree fed therealong.

30. The delimber of claim 19 including mounting means mounted on said support; first feed rolls mounted on said mounting means on the outfeed side of said delimbing means; and second feed rolls mounted on said mounting means beyond said first feed rolls; said delimber, and said feed rolls being in tandem alignment.

31. The delimber of claim 26 wherein said collars are interlinked by arcuate linkage bars.

32. The delimber of claim 27 wherein said collars are interlinked by arcuate linkage bars.

33. The delimber of claim 26 including an annular rotatably mounted on said support means and encircling said feed path; a plurality of arms spaced circumferentially about and pivotally connected to said ring for rotation therewith; a plurality of hubs, one rotatably mounted on each of said arms spaced from its pivot and movable radially relative to said ring with rotation of said arms about their pivots, each of said hubs having an axis of rotation extending substantially parallel to the axis of said feed path; hydraulic means urging said arms to carry said hubs radially inward; and actuatable to urge said arms to carry said hubs radially outward; means for rotating said ring at one speed and for rotating said hubs at a substantially greater speed and a plurality of cutter blades disposed about each of said hubs.

34. The delimber of claim 27 wherein said cutter means comprises; a plurality of hubs, one rotatably mounted on each of said arms spaced from its pivot and movable radially relative to said ring with rotation of said arms about their pivots, each of said hubs having an axis of rotation extending substantially parallel to the axis of said feed path; hydraulic means urging said arms to carry said hubs radially inward; and actuatable to urge said arms to carry said hubs radially outward; means for rotating said ring at one speed and for rotating said hubs at a substantially greater speed and a plurality of cutter blades disposed about each of said hubs.

35. The delimber of claim 33 including means for rotating said ring at one speed and for rotating said hubs at a substantially greater speed.

36. The delimber of claim 26 including a plurality of shafts one rotatably mounted on each of said arms spaced from its pivot, and movably radially relative to said ring with rotation of said arms about their pivots, each of said shafts extending substantially parallel to the axis of said feed path and including said plurality of cutter heads, one fixed to each of said shafts so that said means for rotating said arms about their pivots carries said shafts and the cutter heads carried thereby radially outward from said axis.

37. The delimber of claim 33 wherein said collars are interlinked by arcuate linkage bars.

38. The delimber of claim 34 wherein said collars are interlinked by arcuate linkage bars.

39. The delimber of claim 26 including a plurality of elongated cutter blades on each of said hubs extending radially from and longitudinally along each of said hubs, each of said blades having a cutting edge extending essentially parallel to the axis of said blade.

40. The delimber of claim 27 including a plurality of elongated cutter blades on each of said cutting heads extending radially from and longitudinally along each of said hubs, each of said blades having a cutting edge extending essentially parallel to the axis of said blade.

References Cited by the Examiner

UNITED STATES PATENTS 2,799,304  7/1957  Stewart.
3,074,446  1/1963  Earl.

FOREIGN PATENTS 716,368  8/1965  Canada.

WILLIAM W. DYER, Jr., *Primary Examiner.*

W. D. BRAY, *Assistant Examiner.*